(12) United States Patent
Bartman et al.

(10) Patent No.: US 6,607,630 B2
(45) Date of Patent: Aug. 19, 2003

(54) PRINT BONDED MULTI-PLY TISSUE

(75) Inventors: Gerald Charles Bartman, New London, WI (US); Theodore Bruce Rydell, Pound, WI (US); Joseph M. Celmer, Shawano, WI (US); Michael Lee Bloedorn, Shawano, WI (US)

(73) Assignee: Little Rapids Corporation, Shawano, WI (US)

( * ) Notice: Subject to any disclaimer, the term of this patent is extended or adjusted under 35 U.S.C. 154(b) by 19 days.

(21) Appl. No.: 09/774,395

(22) Filed: Jan. 31, 2001

(65) Prior Publication Data

US 2002/0100544 A1 Aug. 1, 2002

(51) Int. Cl.⁷ .................. B32B 31/08; B32B 31/12; B32B 31/20; B32B 33/00
(52) U.S. Cl. .................. 156/277; 156/290; 156/324; 427/208; 427/210; 427/211
(58) Field of Search .............. 15/257.06; 162/104, 162/108, 109, 111, 112, 119, 122, 282, 280, 362; 156/176, 179, 182, 183, 184, 277, 288, 271, 295, 324, 290; 422/208, 208.6, 210, 211, 280, 288; 428/195, 198, 211, 154; 264/282; 118/204, 206; 427/203, 210, 211

(56) References Cited

U.S. PATENT DOCUMENTS

| | | | | |
|---|---|---|---|---|
| 3,366,532 A | * | 1/1968 | Maskey et al. | 428/292.7 |
| 3,546,056 A | * | 12/1970 | Thomas | 428/110 |
| 3,916,447 A | | 11/1975 | Thompson | |
| 3,953,638 A | | 4/1976 | Kemp | |
| 3,958,055 A | | 5/1976 | Hadley et al. | |
| 4,001,472 A | * | 1/1977 | Thomas et al. | 15/209.1 |
| 4,507,351 A | | 3/1985 | Johnson et al. | |
| 4,610,915 A | | 9/1986 | Crenshaw et al. | |
| 5,466,318 A | | 11/1995 | Bjork | |
| 6,136,422 A | | 10/2000 | Lichtenberg et al. | |

* cited by examiner

*Primary Examiner*—Richard Crispino
*Assistant Examiner*—Sing P Chan
(74) *Attorney, Agent, or Firm*—Nicholas A. Kees; Godfrey & Kahn, S.C.

(57) ABSTRACT

The present invention concerns a device and method for making a roll of tissue using opposingly located adhesive applicators that apply adhesive to opposingly located anilox rolls. Adhesive is transferred from the anilox rolls to opposingly located print rolls. The print rolls apply a void-free layer of adhesive to opposing sides of a central ply which passes between the print rolls. As the central ply passes between opposingly located nip rolls, at least one additional ply is laminated to one side of the central ply and at least one other ply is laminated to the opposing side of the central ply.

19 Claims, 4 Drawing Sheets

PRINT BONDED MULTI-PLY TISSUE

BACKGROUND OF THE INVENTION

The present invention concerns a method and apparatus for manufacturing a laminated tissue product which has a consistent ply bond strength for, among other things, improved flexographic printing ability.

In the field of making roll stock of laminated tissue for use in making paper products such as printed napkins, it is important to be able to achieve a desired or predetermined ply bond strength. It is also important to be able to attain a consistent ply bonding strength throughout the ply layers. As discussed in U.S. Pat. No. 6,136,422, which is incorporated herein by reference, a consistent strength in the ply bonding assists in providing an efficient method to produce printed napkins by flexographic printing. For example, the ability to maintain a consistent predetermined bond strength minimizes breaks in the web during printing and converting. This, in turn, reduces waste and increases in operating efficiency.

While U.S. Pat. No. 6,136,422 purports to provide an improved spray bonding technique, the very nature of spray bonding presents several disadvantages for manufacturing tissue laminates for use in flexographic printing processes and other manufacturing processes. First, spraying involves the random application of adhesive droplets to the ply to create a ply bond. The random nature of this application results in an uneven application of adhesive across the web with small voids of adhesive appearing throughout the web. This creates an inconsistent bond strength in the web which may result in breaks during printing or in other processes which require the web to travel through machinery at high speeds. In addition, adhesive will often accumulate on or around the spray nozzles and drip onto the web in undesirable amounts. This results in the adhesive penetrating multiple layers of the web which results in a situation commonly referred to as blocking. Blocking is one of the main causes of web breaks in paper napkin manufacturing.

Equally important, tissue laminates made from spray bonding further suffer from post-printing deficiencies. For example, when the tissue is printed, the absorbent tissue plies are re-wetted and swelling occurs between the bonding points. Because the adhesive points in a spray bonding process are random in nature, random amounts of swelling will appear along the web with large amounts appearing in some areas and smaller amounts appearing elsewhere. When the tissue re-drys, the printed surface will often appear uneven or distorted as a result of the uneven swelling.

Yet another disadvantage of using spray bonding to form the adhesive bond is that puckering or wrinkling will often occur on the non-printed side of the tissue in the machine direction after printing. This negative effect is, again, the result of the random application of adhesive droplets to form the ply bond. The random application of droplets by spraying results in small pathways being formed in the ply bond which align in the machine direction. A result of these uninterrupted pathways is wrinkling in the post printed product due to a lack of uniform bonding area which prevents a wrinkle from occurring.

SUMMARY OF THE INVENTION

The present invention overcomes the above-mentioned deficiencies in spray bonding. In particular, the present invention overcomes the deficiencies in spray bonding by printing onto the tissue plies a uniform layer of adhesive. In one embodiment, the uniform layer is applied over the entirety of the web. This creates a laminate with no voids in the adhesive layer.

In another embodiment, the adhesive is applied in a pattern which is non-linear and which forms random cells. This embodiment of the present invention provides the same benefits discussed above along with increased loft, if desired.

DESCRIPTION OF THE DRAWINGS

These and other features, objects and advantages of the present invention will become apparent from the following description and drawings wherein like reference numerals represent like elements in several views, and in which.

DESCRIPTION OF THE PREFERRED EMBODIMENT

Set forth below is a description of what are currently believed to be the preferred embodiments or best examples of the invention claimed. Future and present alternatives and modifications to the preferred embodiments are contemplated. Any alternates or modifications in which insubstantial changes in function, in purpose, in structure or in result are intended to be covered by the claims of this patent.

The present invention may be used to create a tissue laminate which may be two-ply, three-ply, or any number of plies in construction where the number of plies may be represented by the letter N and the number of adhesive layers or ply bonds is represented as N-1.

Figure 1:
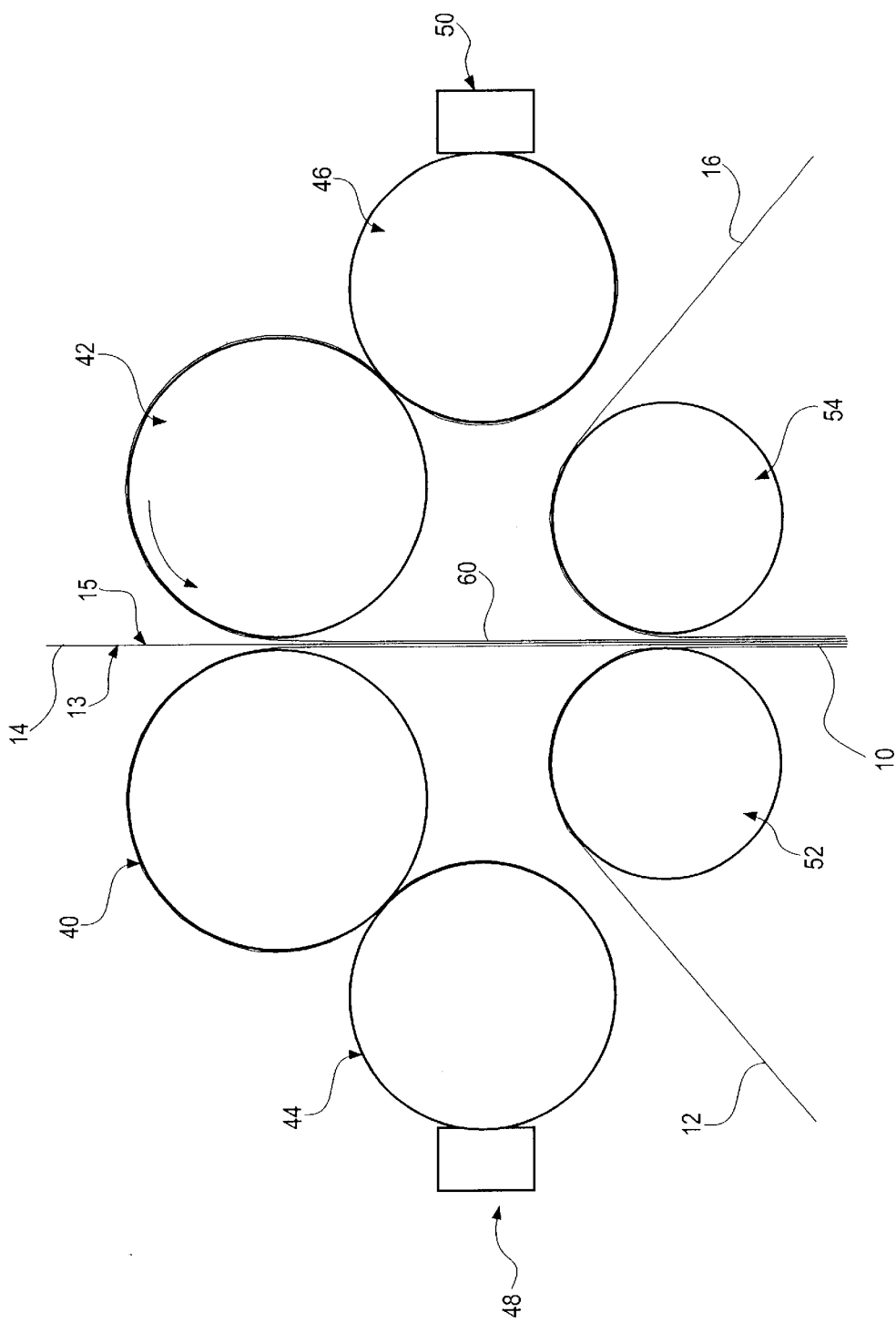
FIG. 1 shows a schematic view of a preferred embodiment of a section of an apparatus suitable for making the tissue laminate of the present invention.
Figure 3:
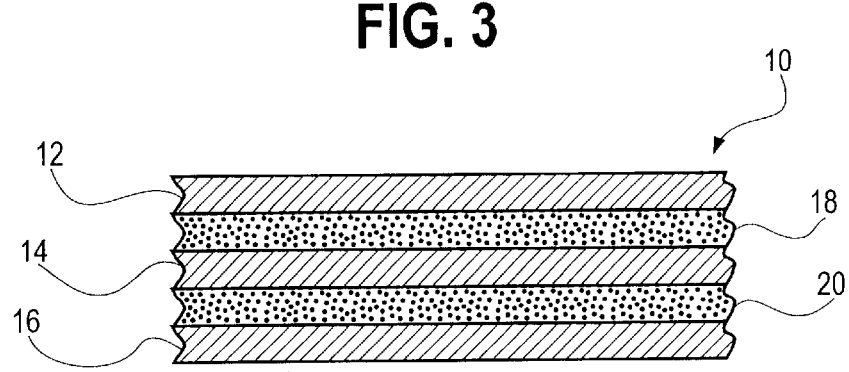
FIG. 3 is a cross-sectional view of a portion of a tissue laminate made in accordance with an embodiment of the invention.

To form three-ply tissue 10 having a first ply 12, second ply 14, third ply 16, and adhesive layers or ply bonds 18 and 20 (FIG. 3), the equipment shown in FIG. 1 may be used. This equipment consists of print rolls 40 and 42, anilox rolls 44 and 46, adhesive applicators 48 and 50, and nips or calendars 52 and 54.

In use, adhesive is first applied to anilox rolls 44 and 46 by applicators 48 and 50. The anilox rolls then transfer the adhesive to print rolls 40 and 42. To form adhesive layers 18 and 20 in such a manner as to be free of voids, the surfaces of print rollers 40 and 42 should be smooth and completely covered with adhesive during processing. This, in turn, will apply a continuous, void-free layer of adhesive to both sides of ply 14, which may be a tissue or a synthetic, non-woven material such as spunbond.

After adhesive is applied to sides 13 and 15 of ply 14, the web 60 is directed towards nips 52 and 54. The nips laminate plies 12 and 16 to ply 14 to form a laminated 3-ply web of tissue 10 which as at least one flat, smooth or even printable surface 27.

Figure 4:
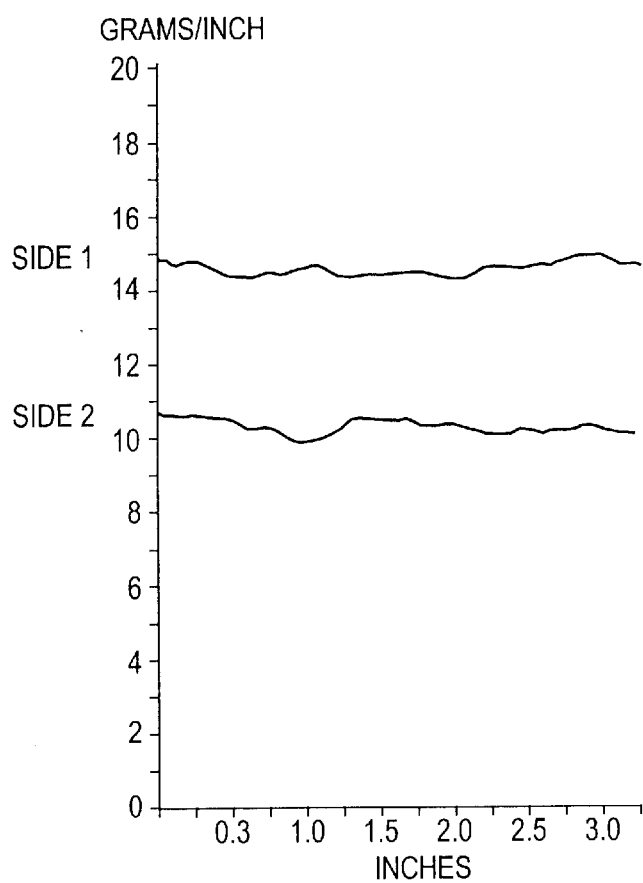
FIGS. 4 and 5 graphically demonstrates how printing adhesive produces a consistent ply bond as compared to spray bonding.
Figure 5:
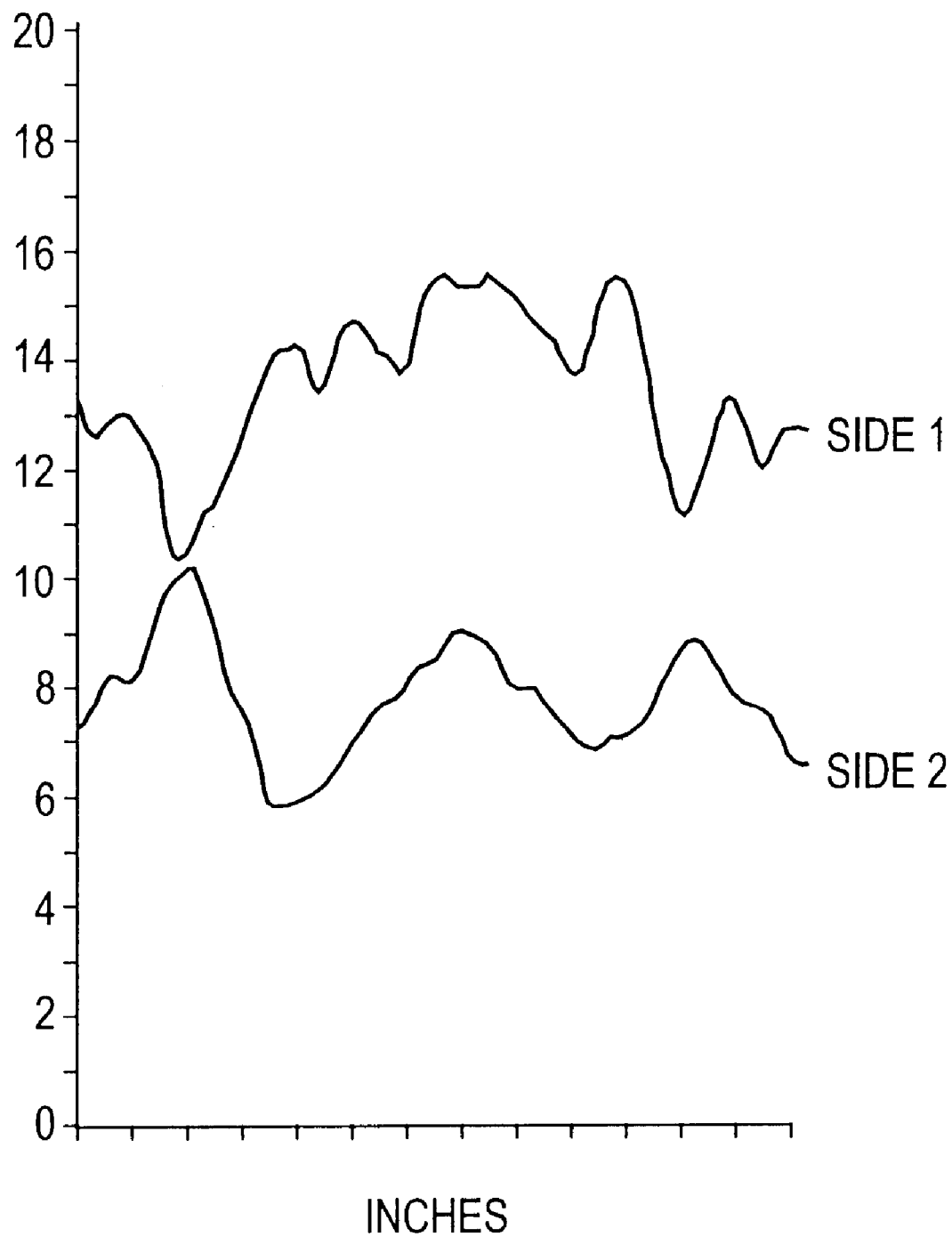

As shown in FIG. 4, the resulting tissue made from the above described process has a consistent peel strength and uniform loft. This stands in stark contrast to tissue made by spray bonding adhesive (See FIG. 5). In addition, when subjected to flexographic printing, no post-printing distortion results since there are no voids in adhesive plies 18 and 20. In addition, the loft of product remains consistent after printing. In one instance, the loft of a tissue manufactured as described above was found to be about 11½ one-thousandths of an inch prior to printing and 12½ one-thousandths of an inch after printing. This consistency is, again, due to the continuous application of adhesive to the entire web which is free of voids. This eliminates swelling between the bonds, which limits the loft from increasing due to swelling. Another advantage of having a void free adhesive layer is that wrinkling on the non-printed side is eliminated. Lastly, because a spray application is not used, no blocking occurs in the web.

Figure 2:
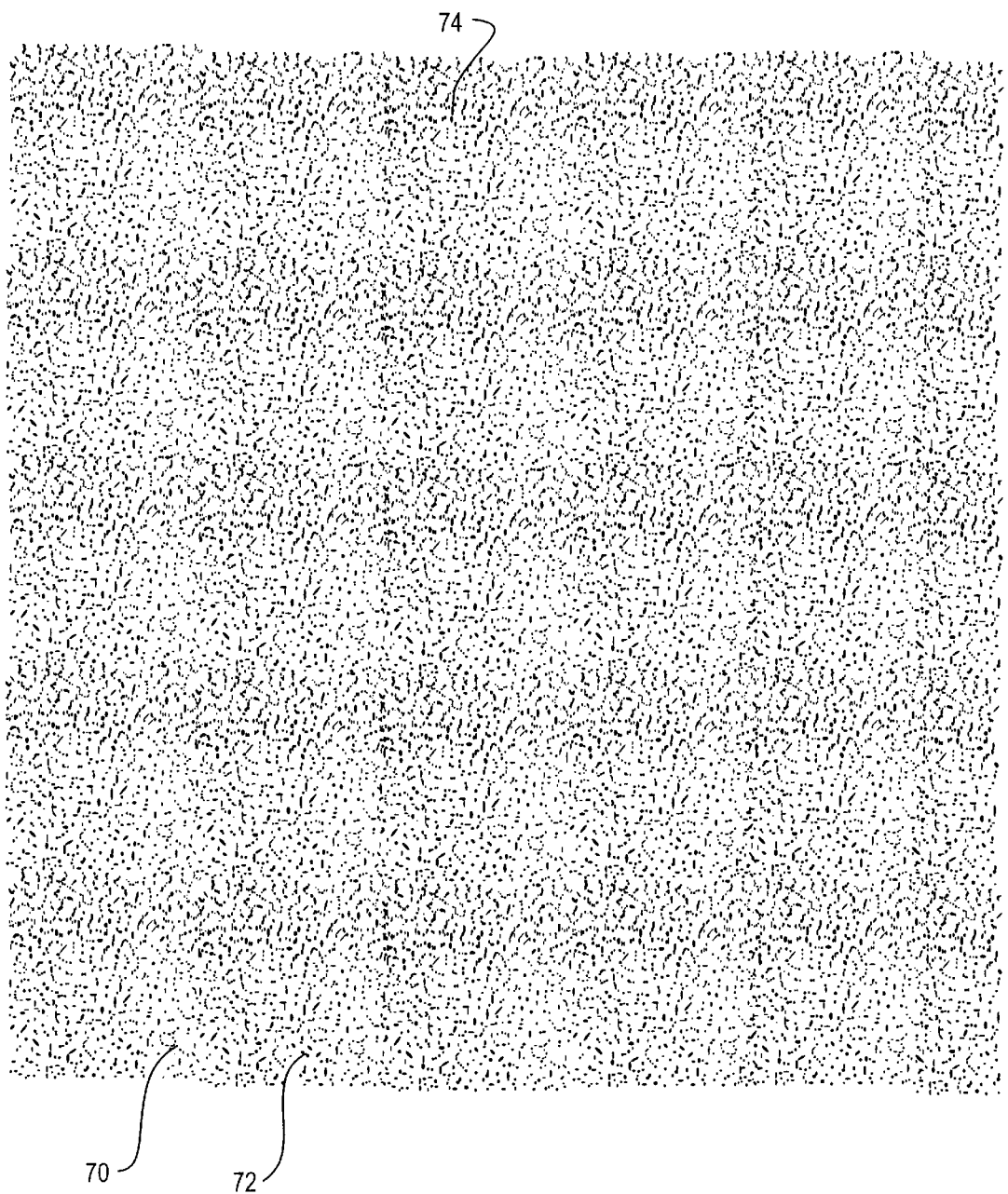
FIG. 2 shows a print pattern that may be used with one embodiment of the present invention.

In another embodiment of the present invention, one or both print rolls may have laser etched upon its surface a pattern such as shown in FIG. 2. The pattern etched on the print rollers will be transferred to ply 14 as an adhesive layer of the same pattern. This pattern may be generally described as consisting of non-linear adhesive points 70 which intersect to form random cells 72 and 74. Using the adhesive pattern described prevents wrinkling in the non-print side since a continuous path cannot be traced in the web in the machine direction. Post-printing distortion is also minimized since any swelling is random in nature due to the structure of the cells 72 and 74 and this creates a smooth, distortion-free appearance in the product.

It has been found that using a pattern on at least one print roller, and a smooth surface of the opposing roller also increases loft. In one sample, made according to this process, the non-printed loft increased from above 11 one-thousandths of an inch to 14 one-thousandths of an inch after printing.

Differential speeds between the anilox rollers and print rollers may be used to control the amount of adhesive applied. A faster anilox roll and slower print roll applies more adhesive. A faster print roller and slow anilox roller applies less adhesive. By adjusting the speeds of the anilox roll and print roll, the amount of adhesive used, and hence the strength of the ply bond, may be controlled and adjusted as desired. Lastly, one of the nips may be made of steel or some other suitably hard material while the opposing nip may be made of a softer material such as rubber.

While the preferred embodiments of the present invention have been illustrated and described, it will be understood by those of ordinary skill in the art that changes and other modifications can be made without departing from the invention in its broader aspects. Various features of the present invention are set forth in the following claims.

What is claimed is:

1. A method for making a roll of tissue comprising:
   a. using opposingly located adhesive applicators to apply adhesive to opposingly located anilox rolls;
   b. transferring said adhesive from said anilox rolls to opposingly located print rolls;
   c. using said print rolls to apply a void-free layer of said adhesive to opposing sides of a central ply which passes between said print rolls; and,
   d. as said central ply passes between opposingly located nip rolls, at least one additional ply is laminated to one side of said central ply and at least one other ply is laminated to said opposing side of said central ply to create a flat, printable surface on said tissue.

2. The method of claim 1 wherein said central ply is a synthetic material.

3. The method of claim 1 wherein said central ply is a non-woven material.

4. The method of claim 1 wherein said tissue has a uniform loft.

5. The method of claim 1 wherein said tissue has a consistent peel strength.

6. A method for making a roll of tissue for use in a printing process comprising:
   a. using opposingly located adhesive applicators to apply adhesive to opposingly located anilox rolls;
   b. transferring said adhesive from said anilox rolls to opposingly located print rolls;
   c. using said print rolls to apply to a void-free layer of said adhesive to opposing sides of a central ply which passes between said print rolls;
   d. as said central ply passes between opposingly located nip rolls, at least one additional ply is laminated to one side of said central ply and at least one other ply is laminated to said opposing side of said central ply to create a flat, printable surface on said tissue; and,
   e. said tissue is subjected to flexographic printing, where said tissue displays no post printing distortion results.

7. The method of claim 6 wherein said central ply is a synthetic material.

8. The method of claim 6 wherein said central ply is a non-woven material.

9. The method of claim 6 wherein said tissue has a uniform loft.

10. The method of claim 6 wherein said tissue has a consistent peel strength.

11. A method for making a roll of tissue comprising:
    a. using opposingly located adhesive applicators to apply adhesive to opposingly located anilox rolls;
    b. transferring said adhesive from said anilox rolls to opposingly located print rolls;
    c. using said print rolls to apply adhesive on opposing sides of a central ply which passes between said print rolls, where said print rolls have an outer surface for applying adhesive to the central ply with a plurality of nonlinear points formed in a pattern on the roll, which pattern is sufficiently non-linear that a continuous pattern cannot be traced in the machine direction;
    d. as said central ply passes between opposingly located nip rolls, at least one additional ply is laminated to one side of said central ply and at least one other ply is laminated to said opposing side of said central ply.

12. The method of claim 11 wherein said central ply is a synthetic material.

13. The method of claim 11 wherein said central ply is a non-woven material.

14. A method for making a roll of tissue for use in a printing process comprising:
    a. using adhesive applicators to apply adhesive to anilox rolls;
    b. transferring said adhesive from said anilox rolls to print rolls;
    c. using said print rolls to apply adhesive on opposing sides of a central ply which passes between said print rolls, where said print rolls have an outer surface for applying adhesive to the central ply with a plurality of nonlinear points formed in a pattern on the rolls, which pattern is sufficiently non-linear that a continuous pattern cannot be traced in the machine direction;
    d. as said central ply passes between opposingly located nip rolls, at least one additional ply is laminated to one side of said central ply and at least one other ply is laminated to said opposing side of said central ply to create a printable surface on said tissue.

15. The method of claim 14 wherein said central ply is a synthetic material.

16. The method of claim 14 wherein said central ply is a non-woven material.

17. The method of claim 14 wherein the printable surface is smooth.

18. The method of claim 14 wherein the printable surface is flat.

19. The method of claim 14 further comprising subjecting said tissue flexographic printing, where said tissue displays no post printing distortion results.

* * * * *